Jan. 21, 1964   R. L. BURTNER ETAL   3,119,106
RADAR TERRAIN CONTOUR DISPLAY SYSTEM
Filed Jan. 11, 1960   3 Sheets-Sheet 1

INVENTORS.
RICHARD L. BURTNER
BY JAMES H. MILLER

ATTORNEY ed States Patent Office 3,119,106
Patented Jan. 21, 1964

3,119,106
RADAR TERRAIN CONTOUR DISPLAY SYSTEM
Richard L. Burtner, Canton, and James H. Miller, North Canton, Ohio, assignors to Goodyear Aerospace Corporation, a corporation of Delaware
Filed Jan. 11, 1960, Ser. No. 1,649
3 Claims. (Cl. 343—7.9)

This invention relates to airborne radars, and, more particularly, is concerned with radars of this type particularly adapted to display terrain contours or elevations.

One of the main difficulties of present day radar equipment is the lack of ability to display the received information in a manner which is readily recognizable from a knowledge of terrain characteristics. As long as the radar picture contains a shoreline, large lake, a river, or other well-defined terrain feature recognition is not difficult. However, when the radar return is from relatively flat land about the only recognizable targets are cities, but even in this case considerable skill is required of the radar operator to properly interpret the picture.

Additionally, there are times in flying over relatively rough terrain when it is highly desirable to obtain information concerning altitude or elevation of the various scatterers forming the radar return.

It is the general object of the present invention to provide a radar system in which the return signal information is so displayed that the terrain can more readily be recognized because the contour or elevation of the terrain is illustrated, the radar system being characterized by comparative simplicity, and reliability.

Another object of the invention is to provide a radar system in which the display picture has a stability which, as a function of displacement is much greater than in conventional radar.

Another object of the invention is to provide an airborne radar of the type described which produces a picture having a density at any point which is proportional to the elevation, with respect to an arbitrary plane, such as sea level, of the corresponding area on the ground.

Another object of the invention is to produce in an airborne vehicle, as a radar picture, a contour map of the ground or terrain wherein the elevations are indicated by contour lines, or by a combination of contour lines and variable density.

Another object of the invention is to provide a radar picture of the character set forth which is particularly useful in very high altitude applications, for example, above 50 miles, at which altitude conventional radar display systems yield very little contrast because of the lack of shadows.

The foregoing objects of the invention, and other objects which will become apparent as the description proceeds, are achieved by the provision in combination of an airborne radar adapted to transmit microsecond pulses with listening periods there-between for return signals from scatterers, a scanning antenna transmitting the pulses on a pencil-like scanning beam, means for effecting scanning movement of the antenna, means including a cathode ray tube having an electron beam for displaying the return signals, means for moving the electron beam of the cathode ray tube in a manner coordinated with the scanning movement of the antenna, means converting the radar return signals from range to a vertical component of range, means responsive to altitude providing a reference voltage, means mixing the output of the converting means and the reference voltage, means connecting the output of the mixing means to intensity modulate the electron beam of the cathode ray tube to paint the return signals from various scatterers on the terrain in proper range and azimuth and with an intensity proportional to altitude of the scatterers.

For a better understanding of the invention reference should be had to the accompanying drawings wherein FIG. 1 is a diagrammatic view of the radar system and illustrating an airplane flying over contoured terrain;

Figure 1:
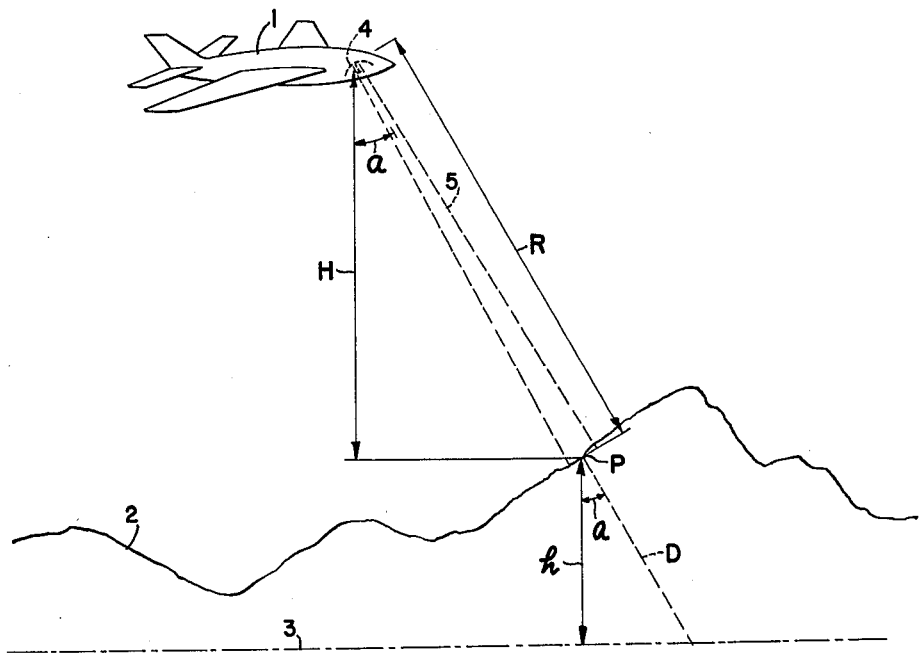

Referring to FIG. 1, the numeral 1 indicates an aircraft carrying the radar system of the present invention and flying over terrain 2 positioned in respect to a horizontal reference plane 3 which can be at any arbitrarily selected elevation above or below the terrain 2, but which, for example, can be sea level.

Figure 2:
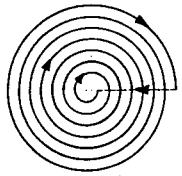
FIG. 2 is a view of the spiral path of scanning movement employed by the pencil-like beam.

The transmitting antenna 4 carried by the aircraft 1, usually on a stabilized platform, is adapted to transmit a relatively narrow pencil-like beam 5 which may be moved with any of a variety of scanning movements, a typical scanning movement being shown in FIG. 2 wherein the beam 5 starts at a point vertically beneath the aircraft 1, with angle $a$ equal to zero, and then moves spirally outward until the angle $a$ between the beam 5 and a vertical reaches, for example, 45 degrees, whereupon the beam snaps back to its starting point, completing one scanning cycle, and the operation is thereafter repeated. The complete scanning cycle may be on the order of one second, being usually at the maximum rate possible as determined by the altitude of the airplane or aircraft 1 and the pulse repetition rate. It will be evident that the scanning movement of the pencil beam 5 is thus relatively slow so that any target or scatterer illuminated by the beam will have the return signal back to the radar before the beam 5 has moved very far from the particular scatterer causing the return signal.

Of course, the pulse repetition frequency of the microsecond pulses sent out by the radar transmitter on the beam 5 may be 500 or more times a second, as a typical example, with each transmitted pulse being typically a fraction of one microsecond and the term micro-second as used herein shall be interpreted to mean a fraction of a micro-second.

The beam 5 striking the terrain or a scatterer at point P means that it is desirable to make the density or brightness of the point P on the radar indicator proportional to the elevation of point P above the reference plane 3. This elevation, indicated at $h$, is seen to be $D \cos a$, wherein angle $a$ is the angle between the beam and a vertical and $D$ is the distance between point P and the reference plane in the direction of the beam 5.

It will be evident that two pieces of information are available from the radar return at any instant. These are the angular position of the beam 5, both in azimuth and in terms of vertical angle $a$, and the range R to the terrain or scatterer P. From this fundamental information the radar picture may be generated.

Figure 3:
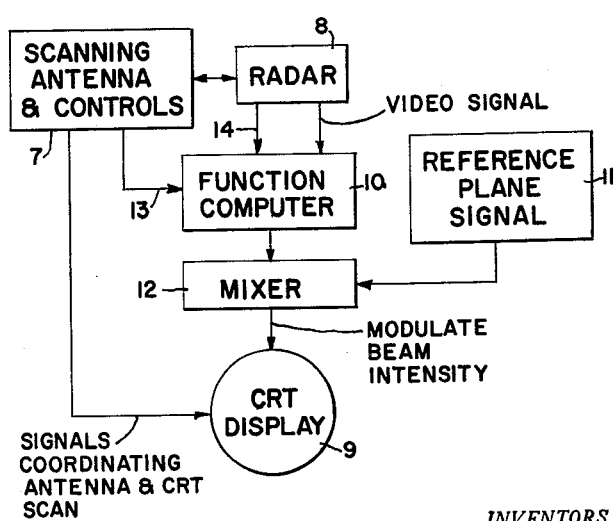
FIG. 3 is a block diagram of the radar system diagrammatically shown in FIGS. 1 and 2.

More particularly, when having reference to FIG. 3, the scanning antenna and controls 7 are connected to the radar 8 in standard and well-known manner, and are likewise connected to the deflection control of a cathode ray tube 9 having an electron beam and providing the picture display for the radar 8. In conventional and known fashion the electron beam is caused to scan the CRT 9 in a manner fully coordinated with the scanning movement of the antenna 4 over the terrain 2, and with the same one second cycle, for example, given heretofore.

The video signal output of the radar 8 is fed to a function computor 10 which may determine the height H by simply multiplying the cosine of angle $a$ times the distance R. With H established then it is possible to compute the elevation $h$ by reference to the reference plane 3 as will now be described.

It is generally advisable to provide a reference plane signal, indicative of the position of plane 3. Typically if plane 3 is at sea level a sensitive radio or other altimeter may be employed which has a relatively long time constant to provide a reference signal supplied to a summing unit 12 to which the output of the function computor 10 is likewise connected. The summing unit 12 performs a simple summing of the outputs of computor 10 and reference plane signal 11, and the output of the unit 12 passes to the electron beam of the CRT 9 to intensity modulate the beam in terms of elevation. Completing the combination is a connection 13 from the scanning control to the computor 10 and indicating the angle $a$ whereby the cosine of this angle can be appropriately calculated.

It is believed that the operation of the apparatus will be understood from the foregoing description. Perhaps it should be mentioned here that each radar pulse operating through a connection 14 triggers the function computor 10 to start a computation of the length of time before the video signal return from a scatterer of the particular pulse, this term of time being transposed into terms of range R and with the voltage thereof being, for example, inversely proportional to the distance so that the shorter the time is the greater the output voltage is whereby the scatterers having the greatest elevation appear as the brighest areas on the CRT display 9 when the intensity of the electron beam of this display is modulated by the output voltage. Of course, the voltage modulating the CRT beam could be directly proportional to range which would mean that the scatterers having the greatest elevation would be darkest, but this is normally not preferred.

Figure 4:
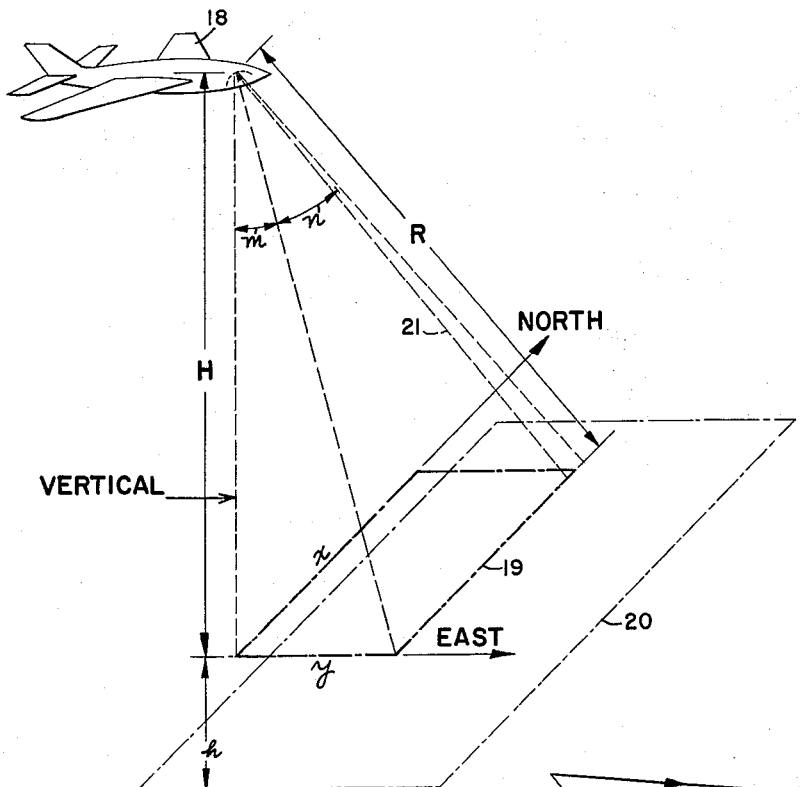
FIG. 4 is a view similar to FIG. 1 but illustrating a modified form of the invention.

Coming now to the modification of the invention illustrated in FIGS. 4 through 7, and having particular reference to FIG. 4, this figure shows an aircraft 18 flying over terrain 19 positioned in relation to a reference plane 20, typically at sea level and having a pencil type scanning beam 21, a radar range R, a distance X, a distance Y, both X and Y being measured from a point directly under the aircraft, an angle $m$ and an angle $n$, a distance $h$ which is the height of the terrain above the reference plane 20, and a distance H+ has the altitude of the airplane above the reference plane 20, all as evident from FIG. 4. The distance X is, more particularly, the distance north and is $$X = R \sin n$$

The distance Y, more particularly, is the distance east, and is $$Y = R \cos n \sin m$$

The angle $m$ is $m$ = antenna outer gimbal angle

The angle $n$ is $n$ = antenna inner gimbal angle

It is evident from these definitions that it is assumed that the antenna and its gimbal mountings are supported on a platform in the aircraft which is itself stabilized to local vertical and north.

Figure 5:
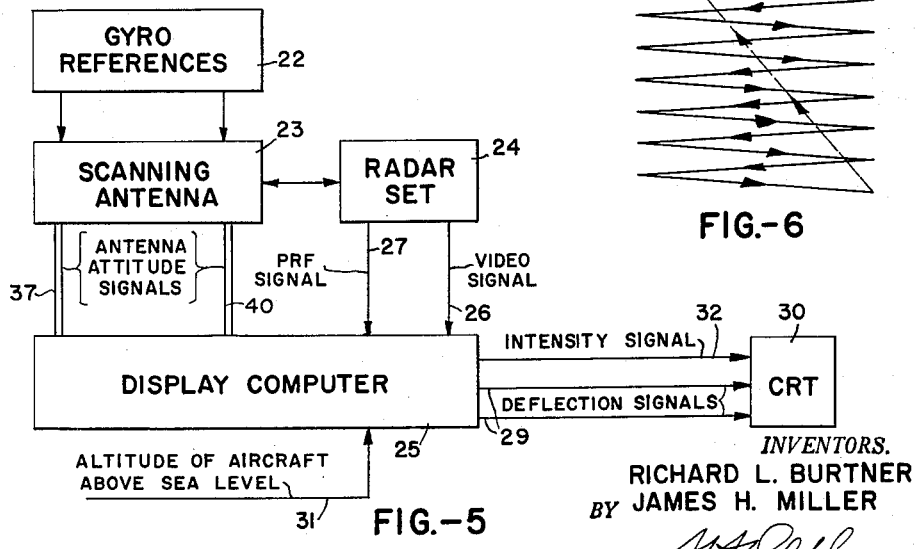
FIG. 5 is a view similar to FIG. 3 but of the modified form of the invention of FIG. 4.

Now referring to FIG. 5 of the drawings this is a block diagram, the circuity including gyro references 22 for the scanning antenna 23. Radar set 24 is connected to scanning antenna 23, and as before described, to send out microsecond pulses, with interposed listening periods, at a desired pulse repetition frequency dependent upon altitude of the aircraft.

A display computor 25 receives video signals from the radar returns of the radar set 24 by means of a connection 26, and a connection 27 provides a pulse repetition frequency signal from the radar set 24 to the computor 25. Connections 37—40 extending from the scanning antenna 23 to the computor 25 provide antenna attitude information to the computor and deflection signal connection 29 from the computor lead to the deflection plates of a cathode ray tube display 30 whereby the scanning movement of the electron beam of this tube is controlled and coordinated with the scanning movement of the radar beam 21.

Fed into the computor 25 is an altitude signal from the reference plane 20, for example sea level, this signal 31 being effectively mixed or summed in the computor 25 to provide an intensity out signal by way of connection 32 to the CRT display 30 whereby the intensity of the electron beam is varied as a function of the height of a particular scatterer above the reference plane, this intensity being normally greatest, as before explained, for the shortest range scatterer, although exactly the reverse could be true.

If the display coordinates of CRT display 30 are to accurately represent distances on the ground it is necessary to compute $$X = R \sin n \text{ and } Y = R \cos n \sin m$$

where:

$X$ = distance north
$Y$ = distance east with R, $n$, and $m$ being defined as set forth above. The terrain elevation above sea level, i.e., the reference plane 20, can be obtained from the equation:

$$h = H + h - R \cos n \cos m$$

where:

$h$ = terrain elevation above sea level
$H + h$ = altitude of aircraft above sea level In order to take full advantage of the resolution of radar ranging it is necessary to know $H + h$ to an accuracy of about 100 feet. However, a relative altitude display could be produced by employing an altimeter of low accuracy, such as a barometric altimeter, provided the error in the altimeter is relatively constant over the complete scanning cycle.

Figure 7:
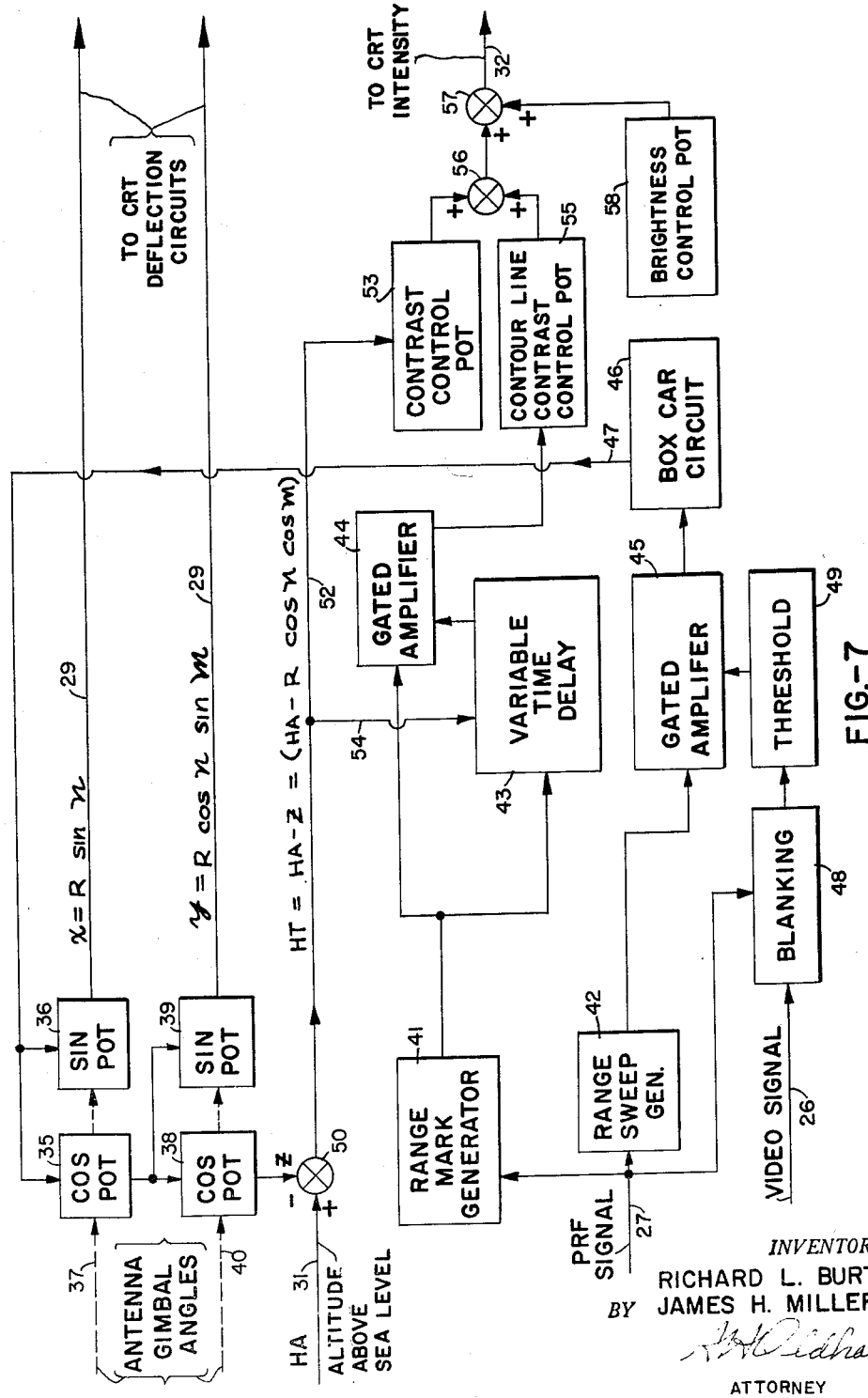

Looking now at FIG. 7 which constitutes a block diagram of the display computor 25 of FIG. 5, a cosine potentiometer 35 and a sine potentiometer 36 are controlled by the antenna gimbal angle connection 37 for angle $n$, and a cosine potentiometer 38 and a sine potentiometer 39 are controlled by a connection 40 from the antenna gimbal angle of angle $m$. The output of potentiometer 36 is connected at 29 to the CRT deflection circuit providing an output in accord with the equation $X = R \sin n$. The output of potentiometer 39 likewise connects to the CRT deflection circuit connections 29, and is in accord with the equation $Y = R \cos n \sin m$.

Connection 27 supplies the pulse repetition frequency signal to a range mark generator 41 and a range sweep generator 42. The range mark generator 41 is connected to a variable time delay 43 and through it to a gated amplifier 44. The range sweep generator 42 connects to gated amplifier 45 in turn connected through a box car circuit 46 by way of a connection 47 to potentiometers 35 and 36. The video signal output 26 as well as the PRF signal 27 passes through a blanking box 48, a threshold unit 49 into gated amplifier 45.

But more particularly, in blanking box 48, the video signal 26 is blanked by the PRF signal 27. Noise is removed by the threshold 49 and the resulting video signal provides a gate to gated amplifier 45 so that the output of the box car circuit 46 is a voltage proportional to the radar transmission time.

Connection 31 supplies voltage to summing unit 50 connected to the output of potentiometer 38, and passing by way of connection 52 to a contrast control potentiometer 53 with connection 54 extending to the variable time delay 43 from connection 52. The output of gated amplifier 44 extends to potentiometer 55, for contour line contrast control, the outputs of potentiometers 53 and 55 to mixer 56 and summing unit 57 to connection 32 extending to the CRT intensity beam control. A potentiometer 58 connected to summing unit 57 acts as a brightness control. More specifically, connection 54 feeds a signal into the variable time delay 43 to delay the train of range mark pulses. This delayed train of pulses then functions as a gate to bias range mark pulses in gated amplifier 44. This has the effect that when the variable time delay is an integral number of range mark intervals a spot will be painted on the CRT.

All of the equipment represented by the boxes and described in the preceding several paragraphs are known to the man skilled in the art and will not be described in detail.

The connection 52 provides a voltage to potentiometer 53 substantially in accord with the equation $$h = (H + h - R \cos n \cos m)$$

Thus, the mechanisms described effect the mechanization and solution of the equations solving for X, Y, and $h$. In addition, the remaining circuitry illustrated and described obtains the range information from the video signal and converts it into a D.C. signal proportional to range. This range signal is then fed to the function potentiometers 35, 36, 38 and 39 which in turn compute the equations above. The signal $h$ in connection 52 is used to control the CRT intensity, and the X and Y signals in connections 29 are used to control the CRT deflection.

Figure 6:
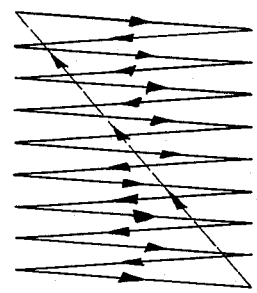
FIG. 6 illustrates a typical antenna scanning pattern of the modified invention of FIG. 4; and, FIG. 7 is a block diagram of the display computor portion of the block diagram of FIG. 5.

It will be recognized that the exact manner of moving the scanning beam 21 can take a variety of forms. In FIG. 6 one typical antenna scanning pattern is illustrated. It may be possible in high speed aircraft to merely swing the scanning beam in a single plane at a constant angle to the line of flight of the aircraft, and to allow the forward movement of the aircraft to effect the forward movement of the scan.

While a certain representative embodiment and details have been shown for the purpose of illustrating the invention, it will be apparent to those skilled in this art that various changes and modifications may be made therein without departing from the spirit or scope of the invention.

What is claimed is:

1. In a radar terrain contour display system, an airborne radar adapted to transmit microsecond pulses with listening periods therebetween for return signals from scatterers, a scanning antenna transmitting the pulses as a pencil-like scanning beam, means for effecting scanning movement of the antenna, means including a cathode ray tube having an electron beam for displaying the return signals, means for moving the electron beam of the cathode ray tube in a manner coordinated with the scanning movement of the antenna, means converting the radar return signals from range to a vertical component of range, altitude indicating means providing a reference voltage, means summing the output of the converting means and the reference voltage, and means connecting the output of the summing means to intensity modulate the electron beam of the cathode ray tube to produce the return signals from various scatterers on the terrain in proper range and azimuth on the cathode ray tube and with an intensity proportional to the altitude of the scatterer.

2. In a radar terrain contour display system, an airborne radar adapted to transmit microsecond pulses with listening periods therebetween for return signals from scatterers, a scanning antenna transmitting the pulses as a pencil-like scanning beam, means for effecting scanning movement of the antenna, means including a cathode ray tube having an electron beam for displaying the return signals, means for moving the electron beam of the cathode ray tube in a manner coordinated with the scanning movement of the antenna, means converting the radar return signals from range to a vertical component of range, altitude indicating means providing a reference voltage, means summing the output of the converting means and reference voltage and means connecting the output of the summing means to intensity modulate the electron beam of the cathode ray tube to produce the return signals from various scatterers on the terrain in proper range and azimuth on the cathode ray tube and with an intensity which is a function of the altitude.

3. In a radar terrain contour display system, an airborne radar adapted to transmit microsecond pulses with listening periods therebetween for return signals from scatterers, the pulse repetition frequency being at least about 500 per second, a scanning antenna transmitting the pulses as a pencil-like scanning beam, means for effecting scanning movement of the antenna, each antenna scan taking at least one second, means including a cathode ray tube having an electron beam for displaying the return signals, means for moving the electron beam of the cathode ray tube in a manner coordinated with the scanning movement of the antenna, means converting the radar return signals from range to a vertical component of range, altitude indicating means providing a reference voltage, means summing the output of the converting means and the reference voltage, and means connecting the output of the summing means to intensity modulate the electron beam of the cathode ray tube to produce thereon the return signals from various scatterers on the terrain in proper range and azimuth and with an intensity proportional to the altitude of the scatterer.

References Cited in the file of this patent

UNITED STATES PATENTS

| | | |
|---|---|---|
| 2,605,463 | Hirschberg et al. | July 29, 1952 |
| 2,616,077 | Holser | Oct. 28, 1952 |
| 2,617,982 | Holschuh et al. | Nov. 11, 1952 |
| 2,648,838 | Raymond | Aug. 11, 1953 |